(12) United States Patent
Graham

(10) Patent No.: US 7,786,983 B2
(45) Date of Patent: *Aug. 31, 2010

(54) APPARATUS AND METHOD FOR A DATA INPUT DEVICE USING A LIGHT LAMINA SCREEN

(75) Inventor: David S. Graham, Mountain View, CA (US)

(73) Assignee: Poa Sana Liquidating Trust, Mountain View, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 10/817,564

(22) Filed: Apr. 1, 2004

(65) Prior Publication Data

US 2004/0201579 A1      Oct. 14, 2004

Related U.S. Application Data

(60) Provisional application No. 60/461,045, filed on Apr. 8, 2003.

(51) Int. Cl.
  *G06F 3/042* (2006.01)
(52) U.S. Cl. ............................... 345/175; 178/18.09
(58) Field of Classification Search ............... 345/173, 345/175, 176; 178/18.09
  See application file for complete search history.

(56) References Cited

U.S. PATENT DOCUMENTS

| | | | |
|---|---|---|---|
| 3,832,028 A | 8/1974 | Kapron | |
| 4,262,996 A | 4/1981 | Yao | |
| 4,367,916 A | 1/1983 | Mottier et al. | |
| 4,440,468 A | 4/1984 | Auracher et al. | |
| 4,746,770 A | 5/1988 | McAvinney | 178/18.09 |
| 4,916,308 A * | 4/1990 | Meadows | 250/221 |
| 5,136,682 A | 8/1992 | Moyer et al. | |

(Continued)

FOREIGN PATENT DOCUMENTS

CN      1260060 A      7/2000

(Continued)

OTHER PUBLICATIONS

International Search Report for Corresponding PCT Application PCT/US04/10297, mailed on Sep. 13, 2004.

(Continued)

*Primary Examiner*—Jimmy H Nguyen
(74) *Attorney, Agent, or Firm*—Beyer Law Group LLP

(57) ABSTRACT

A touch screen or pen-based data entry apparatus and method. The data entry apparatus creates a continuous sheet or "lamina" of light in the free space adjacent a touch screen. An optical position detection device, optically coupled to the lamina of light, is provided to detect data entries to the input device by determining the location of interrupts in the lamina caused when data is entered to the input device. During the method of operation, a user makes a data entry to the device by touching the screen at a predetermined location using an input device, such as a finger, pen or stylus. During the act of touching the screen, the lamina of light in the free space adjacent the screen is interrupted. The optical position detection device detects the position of the input based on the location of the interrupt. Based on the determined position, the data entry is determined.

39 Claims, 3 Drawing Sheets

U.S. PATENT DOCUMENTS

| | | | |
|---|---|---|---|
| 5,265,177 | A | 11/1993 | Cho et al. |
| 5,332,690 | A | 7/1994 | Cho et al. |
| 5,414,413 | A | 5/1995 | Tamaru et al. ............... 345/175 |
| 5,432,877 | A | 7/1995 | Sun et al. |
| 5,480,764 | A | 1/1996 | Gal et al. |
| 5,540,612 | A | 7/1996 | Mendez |
| 5,604,835 | A | 2/1997 | Nakamura et al. |
| 5,719,973 | A | 2/1998 | Monroe et al. |
| 5,850,498 | A | 12/1998 | Shacklette et al. |
| 5,914,709 | A | 6/1999 | Graham et al. ............... 345/179 |
| 6,181,842 | B1 | 1/2001 | Francis et al. ................. 385/14 |
| 6,341,189 | B1 | 1/2002 | Deacon |
| 6,351,260 | B1 | 2/2002 | Graham et al. ............... 345/179 |
| 6,456,766 | B1 | 9/2002 | Shaw et al. |
| 6,470,130 | B1 | 10/2002 | Walker et al. |
| 6,491,443 | B1 | 12/2002 | Serizawa et al. |
| 6,538,644 | B1* | 3/2003 | Muraoka .................... 345/175 |
| 6,555,288 | B1 | 4/2003 | Xu et al. |
| 7,099,553 | B1* | 8/2006 | Graham et al. ............... 385/146 |
| 2002/0030668 | A1* | 3/2002 | Hoshino et al. ............. 345/175 |
| 2002/0118907 | A1 | 8/2002 | Sugama et al. |
| 2003/0035632 | A1 | 2/2003 | Glebov et al. |
| 2003/0174943 | A1 | 9/2003 | Caracci et al. |
| 2003/0203315 | A1 | 10/2003 | Farahi et al. |
| 2003/0231851 | A1 | 12/2003 | Rantala et al. |
| 2004/0017974 | A1 | 1/2004 | Balch et al. |
| 2004/0022487 | A1 | 2/2004 | Nagasaka et al. |
| 2004/0076382 | A1 | 4/2004 | Saia et al. |
| 2004/0247236 | A1 | 12/2004 | Yoshimura et al. |
| 2005/0094914 | A1 | 5/2005 | Gines et al. |
| 2005/0128190 | A1* | 6/2005 | Ryynanen ................... 345/173 |
| 2005/0271983 | A1 | 12/2005 | Payne et al. |
| 2006/0001653 | A1 | 1/2006 | Smits |
| 2006/0002655 | A1 | 1/2006 | Smits |
| 2006/0088244 | A1 | 4/2006 | Kukulj et al. |
| 2006/0188196 | A1 | 8/2006 | Charters et al. |
| 2007/0025678 | A1 | 2/2007 | Kushibiki et al. |
| 2007/0237478 | A1 | 10/2007 | D'Aguanno et al. |

FOREIGN PATENT DOCUMENTS

| | | |
|---|---|---|
| EP | 0569181 | 11/1993 |
| EP | 1271211 | 1/2003 |
| JP | 61-043326 A | 3/1986 |
| JP | 62-128318 A | 6/1987 |
| JP | 63-303308 | 12/1988 |
| JP | 07-253853 A | 10/1995 |
| JP | 11-119912 A | 4/1999 |
| JP | 200078349 | 3/2000 |
| JP | 2001-514779 A | 9/2001 |
| JP | 2003177264 | 6/2003 |
| JP | 2004125899 | 4/2004 |
| WO | WO/02095668 | 11/2002 |
| WO | WO03/025644 | 3/2003 |
| WO | WO/03071323 | 8/2003 |
| WO | WO 2004/011974 | 2/2004 |

OTHER PUBLICATIONS

Office Action in U.S. Appl. No. 10/758,759, mailed Aug. 25, 2005.
International Search Report and Written Opinion for PCT application PCT/US2005/019556, mailed on Aug. 29, 2005.
Chen, R. T. "Polymer-Based Photonic Integrated Circuits", Optics and Laser Technology, Elsevier Science Publishers BV, Amsterdam, NL, vol. 25, No. 6, Dec. 1, 1993, pp. 347-365.
U.S. Appl. No. 10/758,759, filed Jan. 15, 2004.
U.S. Appl. No. 10/862,003, filed Jun. 4, 2004.
U.S. Appl. No. 10/861,251, filed Jun. 4, 2004.
Final Office Action in U.S. Appl. No. 11/734,631 mailed Mar. 17, 2008.
International Search Report from PCT/US07/80346 mailed on Mar. 4, 2008.
Written Opinion from PCT/US07/80346 mailed Mar. 4, 2008.
Notice of Allowance in U.S. Appl. No. 10/758,759 mailed Sep. 25, 2008.
Notice of Allowance in U.S. Appl. No. 11/734,631 mailed Oct. 9, 2008.
Office Action in U.S. Appl. No. 11/498,356, mailed Oct. 16, 2008.
Office Action in Chinese Patent Application No. 200580026392.8 dated Aug. 29, 2008.
Office Action in U.S. Appl. No. 10/862,003, mailed Dec. 12, 2008.
Office Action in U.S. Appl. No. 10/862,003, mailed Dec. 14, 2007.
Notice of Allowance in U.S. Appl. No. 11/542,816, mailed Dec. 11, 2007.
Office Action in U.S. Appl. No. 10/817,564, mailed Sep. 21, 2007.
Office Action in U.S. Appl. No. 10/861,251, mailed Jan. 16, 2008.
Office Action in U.S. Appl. No. 10/758,759 mailed Jan. 25, 2008.
Office Action from Corresponding Chinese Application 200580024970.4, mailed Nov. 30, 2007.
Office Action from Corresponding Chinese Application 200580024976.1, mailed Nov. 30, 2007.
Office Action in U.S. Appl. No. 10/862,003, mailed Jun. 2, 2008.
Office Action from Corresponding Chinese Application 2005800263928, mailed Mar. 7, 2008.
International Search Report in PCT/US2007/017134, mailed May 26, 2008.
Written Opinion in PCT/US2007/017134, mailed May 26, 2008.
Notice of Allowance in U.S. Appl. No. 10/861,251 mailed Jun. 27, 2008.
Office Action in Chinese Application 200580024970.4, mailed Aug. 15, 2008.
Office Action from Chinese Application 200580024976.1, mailed Aug. 15, 2008.
Office Action in Chinese Patent Application No. 200580026392.8 dated Dec. 12, 2008.
Notice of Allowance in U.S. Appl. No. 10/862,003, mailed Mar. 9, 2009.
Office Action in Japanese Patent Application No. 2006-509663 dated Oct. 13, 2009.
Notice of Allowance dated Jan. 8, 2009 from U.S. Appl. No. 11/612,099.
Office Action dated Mar. 18, 2009 from U.S. Appl. No. 11/498,365.
Paloczi et al. "Free-standing All-polymer Microring Resonator Optical Filter", Electronics Letters, IEEE Stevebage, GB, vol. 39, No. 23, Nov. 13, 2003, 2 pages.
International Search Report dated Mar. 22, 2006 from International Patent Application No. PCT/US2005/019560.
Written Opinion dated Mar. 22, 2006 from International Patent Application No. PCT/US2005/019560.
International Search Report dated Nov. 22, 2005 from International Patent Application No. PCT/US2005/019480.

* cited by examiner

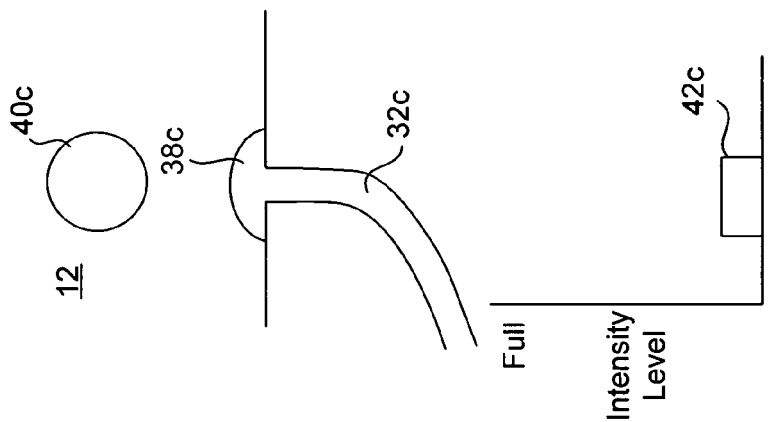
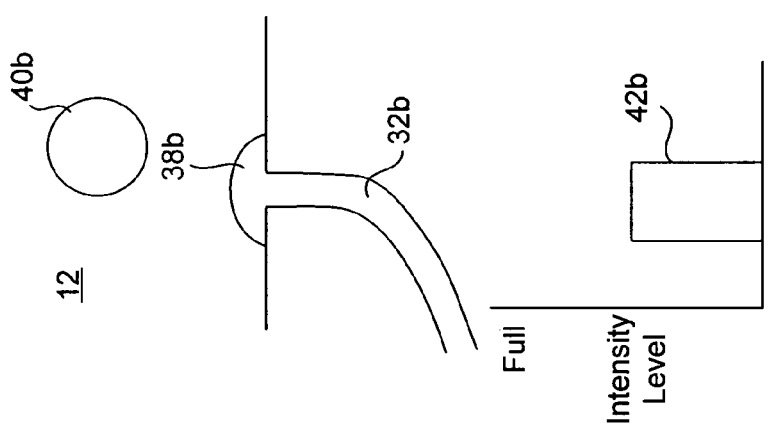
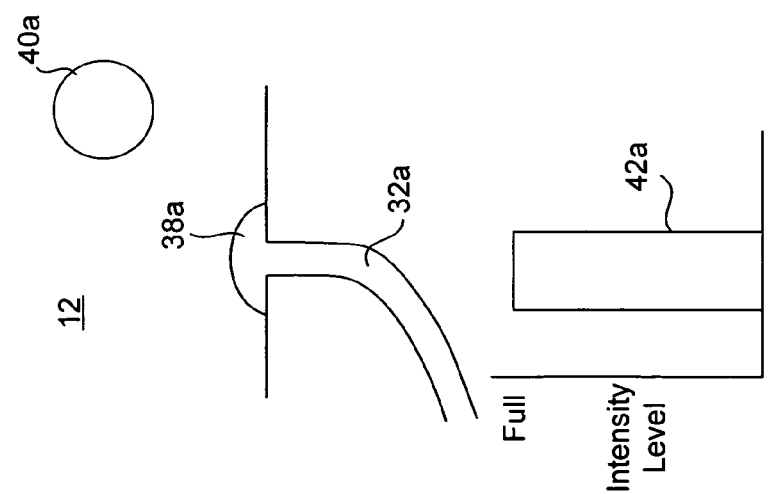
FIG. 3C
FIG. 3B
FIG. 3A

APPARATUS AND METHOD FOR A DATA INPUT DEVICE USING A LIGHT LAMINA SCREEN

CROSS REFERENCE TO RELATED APPLICATIONS

This application claims the benefit of priority under 35 U.S.C. §119(e) to U.S. Provisional Application No. 60/461,045, filed Apr. 08, 2003, entitled OPTICAL POSITION DIGITIZER WITH INPUT LIGHT LAMINA, which is incorporated herein by reference in its entireties and for all purposes.

BACKGROUND OF THE INVENTION

1. Field of the Invention

The present invention relates generally to data input devices, and more particularly, to a continuous sheet or "lamina" of light provided in the free space adjacent a touch screen and to an optical position digitizer that detects data entries by determining the location of "shadows" in the lamina caused by an input device, such as a finger or a stylus, interrupting the lamina when contacting the screen during a data entry operation.

2. Description of the Related Art

User input devices for data processing systems can take many forms. Two types of relevance are touch screens and pen-based screens. With either a touch screen or a pen-based screen, a user may input data by touching the display screen with either a finger or an input device such as a stylus or pen.

One conventional approach to providing a touch or pen-based input system is to overlay a resistive or capacitive film over the display screen. This approach has a number of problems. Foremost, the film causes the display to appear dim and obscures viewing of the underlying display. To compensate, the intensity of the display screen is often increased. However, in the case of most portable devices, such as cell phones, personal digital assistants, and laptop computers, high intensity screens are usually not provided. If they were available, the added intensity would require additional power, reducing the life of the battery of the device before recharge. The films are also easily damaged. In addition, the cost of the film scales dramatically with the size of the screen. With large screens, the cost is therefore typically prohibitive.

Another approach to providing touch or pen-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either a finger or pen, the interruptions in the light beams are detected by the corresponding X and Y photodiodes on the opposite side of the display. The data input is thus determined by calculating the coordinates of the interruption of the light beams as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

Accordingly, there is a need for a data entry apparatus and method having a continuous sheet or "lamina" of light provided in the free space adjacent a touch screen and to an optical position digitizer that detects data entries by determining the location of "shadows" in the lamina caused by an input device, such as a finger or a stylus, interrupting the lamina when contacting the screen during a data entry operation.

SUMMARY OF THE INVENTION

The present invention relates to a data entry apparatus and method. The data entry apparatus has a continuous sheet or "lamina" of light in the free space adjacent a touch screen. An optical position detection device, optically coupled to the lamina of light, is provided to detect data entries to the input device by determining the location of interrupts in the lamina caused when data is entered to the input device. During the method of operation, a user makes a data entry to the device by touching the screen using an input device, such as a finger, pen or stylus. During the act of touching the screen, the lamina of light in the free space adjacent the screen is interrupted. The optical position detection device detects the position of the input based on the location of the interrupt. Based on the determined position, the data entry is determined.

BRIEF DESCRIPTION OF THE DRAWINGS

The invention, together with further advantages thereof, may best be understood by reference to the following description taken in conjunction with the accompanying drawings in which:

FIGS. 3A-3C are a series of diagrams illustrating the decoding of data entries and interrupt shadow interpolation according to one embodiment of the present invention.

In the figures, like reference numbers refer to like components and elements.

DETAILED DESCRIPTION OF THE INVENTION

Figure 1:
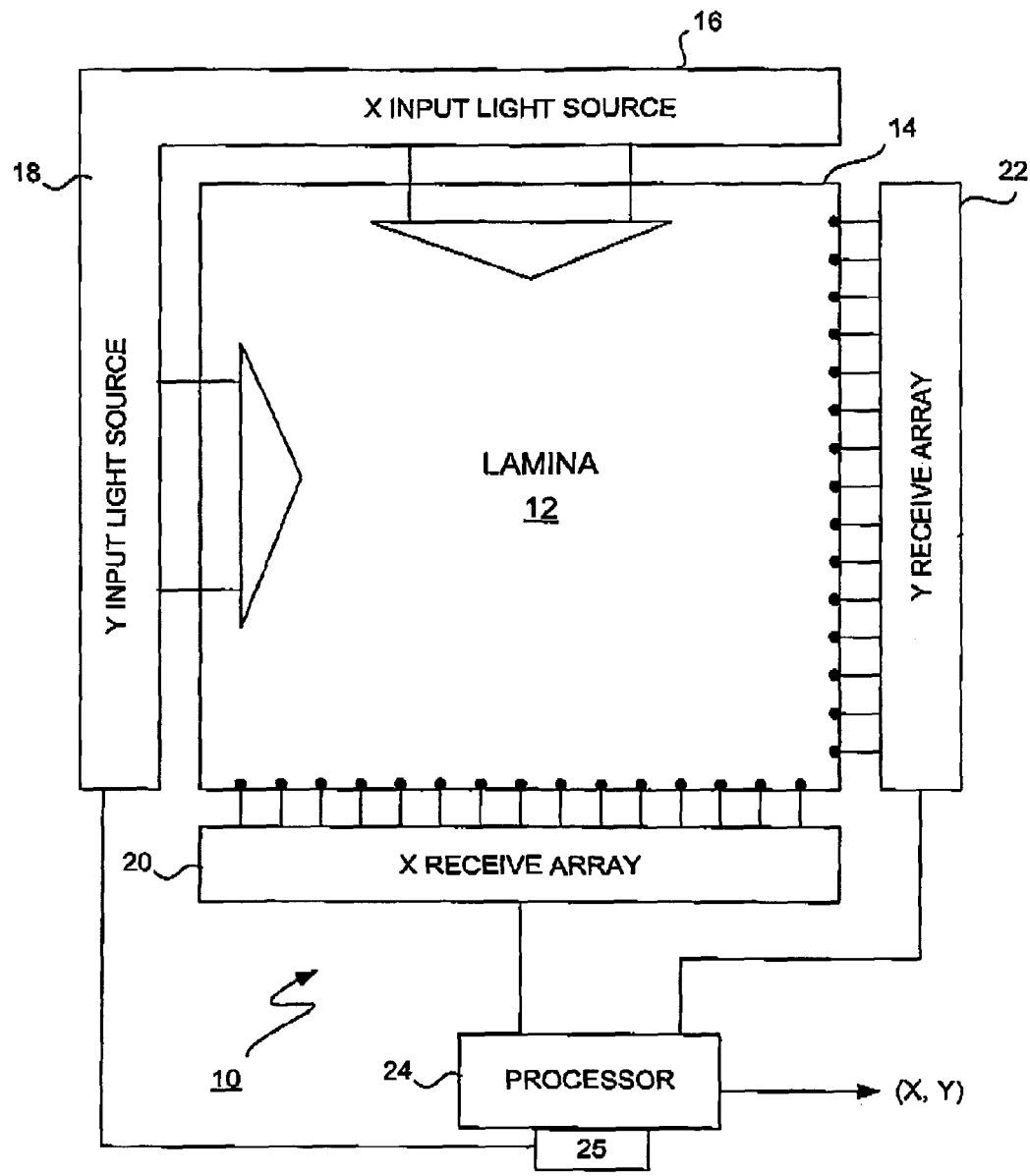
FIG. 1 is a touch screen display according to the present invention.

Referring to FIG. 1, a touch screen display system according to one embodiment of the present invention is shown. The touch screen display system 10 includes a continuous plane or "lamina" 12 of light generated in the free space adjacent to or just above a display screen 14. The lamina 12 is generated by an X axis input light source 16 and a Y axis input light source 18, each configured to propagate light across the free space immediately above the surface of the screen 14 in the X and Y directions respectively. The free space is generally parallel to the surface of the screen 14 and is positioned just in front of the screen 14. The lamina 12 is thus interrupted when an input device (not shown), such as a user's finger or a hand-held stylus or pen, is used to touch the screen 14 during a data entry operation. An X axis light receiving array 20 and a Y axis light receiving array 22 are positioned on the two opposing sides of the screen 14 opposite the X axis and Y axis light sources 16 and 18 respectively. The light receiving arrays 20 and 22 detect the X axis and Y axis coordinates of any interrupt or "shadow" in the lamina 12, caused by an input device breaking the lamina 12 in the free space above the screen 14 during a data entry operation. A processor 24, coupled to the X axis and Y axis arrays 20 and 22, is used to calculate the X axis and Y axis coordinates of the interrupt. Together, the X and Y axis arrays 20 and 22 and the processor 24 provide an optical position detection device for detecting the position of interrupts in the lamina 12. Based on the coordinates of the interrupt, a data entry on the screen 14 can be determined.

The light lamina 12 is substantially of uniform intensity according to one embodiment of the invention. The required dynamic range of the photosensitive circuitry in the receiving X axis and Y axis arrays 20 and 22 is therefore minimized and high interpolation accuracy is maintained. In an alternative embodiment, however, a non-uniform lamina 12 may be used. In this circumstance, the lowest intensity area of the lamina 12 should be higher than the light activation threshold of the light detecting elements used by the X axis and Y axis arrays 20 and 22.

The display screen 14 can be any type of data display according to various embodiments of the invention. For example, the screen 14 can be a display for a personal computer, workstation, server, mobile computer, laptop computer, a point of sale terminal, personal digital assistance (PDA), cell phone, any combination thereof, or any type of device that receives and processes data entries.

The X and Y input light sources 16 and 18 are each a source of collimated light beams according to one embodiment of the invention. The collimated light may be generated in any of a number of different ways. For example, from a single light source mounted at the focal point of a collimating lens. Alternatively, the collimated light beams may be generated from a plurality of point light sources and collimated lenses respectively. In yet another embodiment, the X and Y input light sources 16 and 18 can be made from a fluorescent light and a diffuser. The point light source or sources may be a Light Emitting Diode (LED) or a Vertical Cavity Surface Emitting Laser (VCSEL).

In yet another embodiment, the light source may be a light transmitter with spaced facets fed by a vertical laser. For more details on this embodiment, see U.S. patent application Ser. No. 10/816,639 (now U.S. Pat. No. 7,099,553) entitled Apparatus and Method for Generating Parallel Beams of Light" by David Graham, co-inventor of the subject application and assigned to the assignee of the present application, filed on the same day as the present application, and incorporated by reference herein for all purposes.

The wavelength of the light generated by the X axis and Y axis light sources 16 and 18 used to create the lamina 12 may also vary according to different embodiments of the invention. For example, the light may be of a wide-band having an extended wavelength spectrum range from 350 nanometers to 1100 nanometers, such as white light from an incandescent source. Alternatively, the input light can be of a narrow band having a limited spectrum ranging within 2 nanometers. The use of narrow band light enables the filtering of wide band ambient noise light. The use of narrow band light also enables the substantial matching of the light wavelength to the response profile of the X axis light receiving array 20 and the Y axis light receiving array 22. In yet another embodiment, a homogeneous, single wavelength light, may be used. For example infrared or IR light, commonly used in wireless or remote data transfer communications, may be used in this application.

The light sources, regardless of the type, may also be operated either continuously or periodically, using on an on/off cycle. An on/off cycle conserves power, minimizes the heat generated by the source light, and permits temporal filtering to reduce noise, such as lock in detection. During the off cycle, the X light receiving array 20 and a Y light receiving array 22 measure the passive or "dark" light (noise). The dark light measurement is then subtracted in the processor 24 from the active light detected during the on cycle. The subtraction thus filters out DC background caused by the ambient light. During each off cycle, the passive light may also be calibrated, permitting the system to adjust to changing ambient light patterns.

In yet another embodiment, the X axis and Y axis light sources 16 and 18 may be cycled on and off intermittently. During alternate cycles, when the X axis source 16 is on, the Y axis source 18 is off, and vice versa. This arrangement requires less peak power since only one light source is on at a time, while still allowing subtraction filtering to occur during each X and Y on/off cycle respectively.

To reduce power consumption, a "sleep" mode may also be used for the X axis and Y axis light sources 16 and 18. If no data inputs are made for a predetermined period of time, the intensity of the X axis and Y axis light sources 16 and 18 may be dimmed. The rate at which shadow interrupts are sampled is also done at a low rate, for example, approximately 5 times a second. When a shadow interrupt is detected, the intensity of the X axis and Y axis light sources 16 and 18 and the sampling rate are all increased to a normal operating mode. If no shadow interrupts are detected after the predetermined period of time, X axis and Y axis light sources 16 and 18 are again dimmed and the sampling rate reduced.

The X axis and Y axis arrays 20 and 22 each include substrate waveguide arrays and photosensitive elements. The photosensitive elements are configured to convert light signals into electrical signals indicative of the intensity of the received light. Specifically, each substrate has a plurality of waveguides. Each waveguide has a free space end proximate the lamina 12 and an output end proximate to a photosensitive element. The photosensitive elements are either affixed to or positioned adjacent the output end of the waveguides respectively. For a detailed explanation of the use and manufacture of waveguides, see U.S. Pat. No. 5,914,709 by David Graham et. al., the inventor of the present application, and incorporated by reference herein for all purposes. The photosensitive elements can be implemented using a number of well known ways, for example using Charge-Coupled Devices (CCD) or CMOS/photodiode arrays. Either type of imaging element can be implemented in many forms, including on a dedicated integrated circuit such as an application specific integrated circuit, a programmable circuit, or any other type of integrated or discrete circuit containing photosensitive areas or components. Again, additional details on the various types of photosensitive elements that may be used with the present invention are discussed in the aforementioned patent. Regardless of the type of photosensitive elements used, the output electrical signals indicative of the received light intensity along the X and Y coordinates are provided to the processor 24. The processor 24 determines the location of any shadows in the lamina, caused by an interrupt in the lamina 12 during an input operation, based on the electrical signals.

Figure 2:
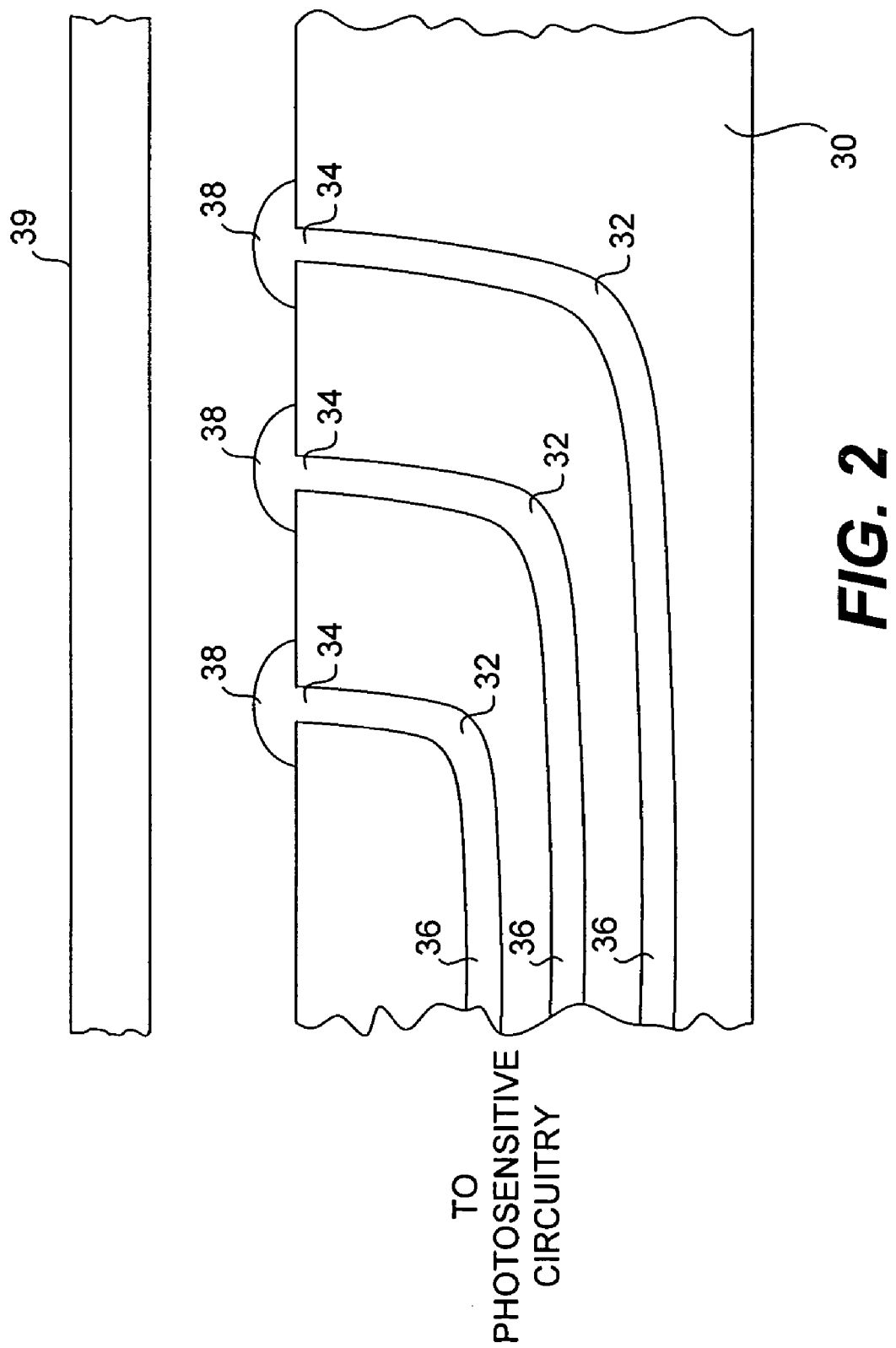
FIG. 2 is a light receiving element used in one embodiment of the present invention.

Referring to FIG. 2, a light receiving element used in one embodiment of the present invention is shown. Specifically, a section of a waveguide substrate 30 used by the X axis 20 and/or the Y axis array 22 is shown. The waveguide substrate 30 includes a plurality of channels 32. Each channel includes a light input end 34 and a light output end 36. The channels provide incident light from the lamina 12 to the photosensitive elements (not shown) on the array. At the light input end 34, an integral light receiving element 38 is provided. A wavelength filter 39, positioned over the light receiving elements, is also provided. The filter 39 is used to filter out ambient light and allow light having a wavelength substantially matching the response profile of the photosensitive elements. In various embodiments, the filter 39 may be either an absorption filter or an interference filter. For the sake of simplicity, only three channels 32 and light receiving elements 38 are shown in FIG. 2. It should be noted that according to one embodiment of the invention, a light receiving elements is provided for each waveguide channel 32 of both the X axis and Y axis arrays 20 and 22 respectively. In alternative embodiments, the light receiving elements may be used for in none or some of the channels 32 in either the X axis and/or Y axis arrays.

The light receiving element 38 is configured to direct incident lamina light into the light receiving end 34 of each waveguide channel 32 respectively. According to various embodiments, the light receiving elements 38 may be a single lens, a compound lens, or some other type of optical system. In any case, the light receiving elements 38 are configured to collect lamina light and focus it into the light receiving end 34 of each waveguide channel 32 respectively. The light receiving elements 38 thus improve the signal-to-noise ratio of the photosensitive elements in a number of ways. Foremost, the light receiving elements 38 enable the collection of more lamina light than otherwise possible without the use of lenses or some kind of optical assembly. The collimation of the lamina light also provides directional filtering which further improves the signal-to-noise ration. Lastly, the light receiving elements 38 are helpful in rejecting angle light, ambient light, reflection flare, and diverging or converging light. The rejection of such noise again is helpful in improving the signal-to-noise ratio.

Referring to FIGS. 3A-3C, a series of diagrams illustrating the decoding of data entries and interrupt shadow interpolation according to one embodiment of the present invention is shown. In this example, the lamina 12 is made of homogeneous light. Each FIG. 3A-3C shows a different location of a shadow interrupt 42a-42c with respect to waveguide channels 32a-32c. The light intensity received by each waveguide channel 32a-32c in each case is represented by an intensity graph 42a-42c respectively. The shadows 40a-40c are created by an input device, such as a finger or stylus, interrupting the lamina 12 when contacting the screen 14. In FIG. 3A, the interrupt shadow 40a does not block any of the light receiving element 38a. As a result, the corresponding light intensity 42a is at a full level, indicating that the shadow interrupt 42a is not blocking any of the light of lamina 12 from being received by element 38a. In FIG. 3B, the shadow interrupt 40b is blocking approximately half of the light from lamina 12. Consequently the intensity graph 42b is approximately half the full amount. Finally, in FIG. 3C, the shadow interrupt 40c is shown completely blocking the light from lamina 12. The intensity level 42c is therefore negligible. Based on the received light intensity values 42a-42c, the location of the interrupt can be interpolated to be at 42c. Interpolation is enhanced by the homogeneity of the lamina. Inhomogeneity in the incident signal is added to the uncertainty in the interpolation.

The use of a continuous plane of light or lamina 12 thus provides a "registration-free" environment. The X axis and Y axis arrays 20 and 22 detect interruptions in the otherwise continuous plane of lamina light 12, as opposed to interruptions in discrete light beams. Accordingly, the need to align discrete light emitting elements with reciprocal light receiving elements opposite the display is eliminated. The lamina 12 also provides improved shadow interruption detection and interpolation. Finally, the devices and methods available for generating the lamina 12 are typically more space and power efficient than what is required to generate discrete light beams.

Although the foregoing invention has been described in some detail for purposes of clarity of understanding, it will be apparent that certain changes and modifications may be practiced within the scope of the appended claims. For example, the present invention has been described with use with a two dimensional (X axis and Y axis) lamina 12. The present invention, however, can be used with either a one dimensional lamina plane (i.e., a line) or even a three dimensional lamina space (X axis, Y axis and Z axis). In any case, the number of light sources and light receiving arrays is generally, but not necessarily, the same as the number of axis used in the system. For example, in the two dimensional lamina 12 illustrated in FIG. 1, X axis and Y axis light sources 16 and 18 are used. However, in alternative embodiments, a single axis light source could be used along either the X axis or the Y axis to create the lamina. Therefore, the described embodiments should be taken as illustrative and not restrictive, and the invention should not be limited to the details given herein but should be defined by the following claims and their full scope of equivalents.

I claim:

1. An apparatus, comprising;
a data input device, the data input device comprising:
a display screen having a first dimension and a second dimension defined by a first axis and a second axis, respectively, the dimensions defining the area for the display screen, the display screen having a free space adjacent the display screen;
a light source configured to generate a substantially continuous lamina of light that is projected from a plurality of spaced apart optical facets such that the lamina extends into the free space adjacent the display screen wherein the lamina extends over a substantial portion of the area of the display screen, the substantially continuous lamina of light being generated when the data input device is on; and
an optical position detection device comprising a light receiving array having a plurality of lenses integrally formed with an associated plurality of optical channels, the array optically coupled to the substantially continuous lamina of light such that the plurality of lenses capture light from the lamina and focus the light into the associated plurality of optical channels, and configured to detect data entries to the input device by determining the location of interrupts in the substantially continuous lamina caused when data is entered to the input device.

2. The apparatus of claim 1, wherein the substantially continuous lamina comprises a three dimensional space defined by the first axis, the second axis, and a third axis.

3. The apparatus of claim 2, wherein the light source includes a first light source configured to generate a first portion of the lamina extending parallel to the first axis and a second light source configured to generate a second portion of the lamina extending parallel to the second axis;
wherein said first and second portions of the substantially continuous lamina of light are periodically cycled on and off during operation of the data input device by alternatively cycling between the first light source and the second light source; and
further comprising a subtraction device configured to subtract the measured ambient light, as determined during an off cycle for each of the first and second portions of the substantially continuous lamina of light, from the measured light during a respective on cycle for each of the first and second portions of the lamina of light.

4. The apparatus of claim 1, wherein the substantially continuous lamina of light is of uniform intensity.

5. The apparatus of claim 1, wherein the substantially continuous lamina of light is of non-uniform intensity.

6. The apparatus of claim 1, wherein the light source configured to generate the substantially continuous lamina of light is a collimated light source.

7. The apparatus of claim 1, wherein the substantially continuous lamina of light is selected from among:
(i) an extended wavelength range from 350 to 1100 nanometers;
(ii) a narrow wavelength range within 2 nanometers; or
(iii) a substantially homogeneous wavelength.

8. The apparatus of claim 1, wherein the substantially continuous lamina of light has a wavelength determined by one of:
(i) an incandescent light source used to generate the substantially continuous lamina of light;
(ii) a specific wave length range substantially matching the response profile of a light receiving element used in the optical position detection device;
(iii) an Light Emitting Diode;
(iv) a Vertical Cavity Surface Emitting Laser (VCSEL), or
(v) an IR wavelength generator used to generate the substantially continuous lamina of light.

9. The apparatus of claim 1, wherein the substantially continuous lamina of light is continuously on during operation of the data input device.

10. The apparatus of claim 1, wherein the substantially continuous lamina of light is periodically cycled on and off during operation of the data input device.

11. The apparatus of claim 1, wherein the display screen is for one of the following types of devices: a data entry device, a personal computer, a workstation, a computer server, a point of sale terminal, a mobile computer, a personal digital assistant (PDA), a cell phone.

12. The apparatus of claim 1, wherein the light source is positioned on one side of the substantially continuous lamina of light opposed to the optical position detection device located on the opposite side of the substantially continuous lamina of light.

13. The apparatus of claim 12, wherein the light source is generated from one of the following:
(i) a point source and a collimating lens; or
(ii) an LED.

14. The apparatus of claim 1, wherein the
the light receiving array is further configured to detect the position of an interrupt in the substantially continuous lamina of light caused during a data entry to the data input device; and
a processor, coupled to the light receiving array, the processor configured to calculate the coordinate of the interrupt on the substantially continuous lamina of light based on the position of the interrupt as detected by the light receiving array.

15. The apparatus of claim 14, wherein the light receiving array includes a waveguide substrate having the plurality of optical channels; and
a plurality of photosensitive elements, each photosensitive element positioned proximate an output end of one of the waveguide channels, and configured to convert a light signal received through the waveguide channel and to convert it into an electrical signal.

16. The apparatus of claim 15, wherein the photosensitive elements comprise one of the following types of photosensitive elements: charge coupled devices or Metal Oxide Semiconductor (MOS) imaging devices.

17. The apparatus of claim 14, wherein the optical position detection device further comprises a light filter to filter a selected wavelength range of light from the substantially continuous lamina of light.

18. The apparatus of claim 1, wherein the substantially continuous lamina of light defines a two dimensional plane and the optical position detection device further comprises a first light receiving array positioned along one side of the substantially continuous lamina and a second light receiving array positioned along a second side of the substantially continuous lamina, wherein the first side and the second side are adjacent to one another.

19. The apparatus of claim 18, wherein the light source further comprises a first light source and a second light source positioned along a third side and an fourth side of the substantially continuous lamina, the third side and the fourth side being adjacent to one another and being opposite of the first side and the second side respectively.

20. The apparatus of claim 1, further comprising a sleep mode element configured to dim the substantially continuous lamina of light if a data entry is not detected by the optical position detection device after a predetermined period of time.

21. An apparatus as recited in claim 1 wherein the data input device comprises a waveguide substrate that supports the plurality of optical fibers and the plurality of integrally formed lenses such that the lenses are formed on and protrude from an inner surface of the waveguide substrate to facilitate the receiving of the substantially continuous lamina of light.

22. The apparatus of claim 1, wherein the substantially continuous lamina of light has a narrow wavelength range within 2 nanometers.

23. A method, comprising;
providing a display screen;
projecting light through a plurality of spaced apart optical facets to generate a substantially continuous lamina of light over a substantial portion of the display screen;
collecting light from the lamina with a light receiving array mounted on a waveguide substrate, the array comprising a plurality of lenses integrally formed with an associated plurality of optical channels configured so that the lenses capture light from the lamina and focus the captured light into the associated plurality of optical channels,
interrupting the substantially continuous lamina of light at selected position, the selected position representing a data entry to a data input device; and
calculating the coordinate location of the interrupt in the substantially continuous lamina of light to determine the data entry.

24. The method of claim 23, wherein the interrupting the substantially continuous lamina of light at the selected position comprises:
identifying the position on said display screen corresponding to a data entry;
touching with an input device the position on the display screen corresponding to the data entry; and
interrupting the substantially continuous lamina of light positioned in the free space adjacent the display screen during the touching of the display screen with the input device; wherein the method further comprises:
identifying the data entry by determining the coordinates of the interruption in the substantially continuous lamina of light.

25. The method of claim 24, wherein the determining the coordinates of the interruption further comprises:
determining the position where incident lamina light is blocked at one or more of a plurality of light receiving elements coupled with the optical channels.

26. The method of claim 23 further comprising generating the substantially continuous lamina of light prior to interrupting the substantially continuous lamina of light.

27. A method, comprising:
providing a data input device, said providing the data input device comprising:
 providing a display screen;
 providing a light source that projects light through a plurality of spaced apart optical facets to generate a substantially continuous lamina of light over a substantial portion of the display screen; and
 providing an optical position detection device comprising a light receiving array having a plurality of lenses integrally formed with an associated plurality of optical channels, the array optically coupled to the continuous lamina of light such that the plurality of lenses capture light from the lamina and focus the light into the associated plurality of optical channels, and configured to detect data entries to the provided input device by determining the location of interrupts in the provided continuous lamina caused when data is entered to the input device.

28. The method of claim 27, whereby the substantially continuous lamina of light in the free space adjacent the provided display screen is interrupted when data entries directed to the provided display screen are made by contacting the display screen.

29. The method of claim 27, wherein the provided substantially continuous lamina of light defines a two dimensional plane and the provided optical position detection device further comprises providing a first light receiving array positioned along one side of the substantially continuous lamina and providing a second light receiving array positioned along a second side of the substantially continuous lamina, wherein the first side and the second side are adjacent to one another.

30. The method of claim 29, further comprising providing a first light source and providing a second light source positioned along a third side and an fourth side of the substantially continuous lamina, the third side and the fourth side being adjacent to one another and being opposite of the first side and the second side respectively.

31. The method of claim 30, wherein the first light source is configured to generate a first portion of the lamina extending from the third side to the first side and the second light source configured to generate a second portion of the lamina extending from the fourth side to the second side;
 wherein said first and second portions of the substantially continuous lamina of light are periodically cycled on and off during operation of the data input device by alternatively cycling between the first light source and the second light source;
 further comprising measuring an ambient light environment during an off cycle for each of the first and second portions of the substantially continuous lamina of light; and
 subtracting the measured ambient light from a measured light during a respective on cycle for each of the first and second portions of the lamina of light.

32. A method of claim 27, wherein the provided substantially continuous lamina comprises:
 (i). a one dimension plane defined by a first axis;
 (ii) a two dimensional plane defined by a first axis and a second axis; or
 (iii) a three dimensional space defined by a first axis, a second axis, and a third axis.

33. The method of claim 27, wherein the provided substantially continuous lamina of light is of uniform intensity.

34. The method of claim 27, wherein the provided substantially continuous lamina of light is of non-uniform intensity.

35. The method of claim 27, wherein the provided substantially continuous lamina of light is periodically cycled on and off during operation of the provided data input device.

36. The method of claim 35, further comprising providing a subtraction device configured to subtract the measured ambient light during an off cycle of the substantially continuous lamina of light from the measured light during an on cycle of the substantially continuous lamina of light.

37. The method of claim 27, wherein the display screen is for one of the following types of devices: a data entry device, a personal computer, a workstation, a computer server, a mobile computer, a point of sale device, a personal digital assistant (PDA), a cell phone.

38. The method of claim 27, wherein the provided substantially continuous lamina of light is generated from a collimated light source.

39. The apparatus of claim 27 wherein providing a light source comprises arranging a plurality of a plurality of spaced apart optical facets along each of a pair of axes to generate said substantially continuous lamina.

* * * * *